United States Patent Office 3,028,305
Patented Apr. 3, 1962

3,028,305
PRODUCTION OF FREE FLOWING GRANULAR
HEPTACHLOR COMPOSITIONS
Walter D. Alvin and Victor Smith, Chicago, Ill., assignors to Velsicol Chemical Corporation, Chicago, Ill., a corporation of Illinois
No Drawing. Filed Jan. 14, 1959, Ser. No. 786,676
4 Claims. (Cl. 167—42)

This invention relates to new formulations of insecticidal compositions. In particular, this invention relates to non-caking, free-flowing insecticide formulations containing relatively high concentrations of normally solid insect toxicants.

Solid insecticides have become valuable and widely used chemicals, both for agricultural and domestic applications. Such insecticides as heptachlor, aldrin, dieldrin, endrin, DDT and lindane are exemplary of this group of insect toxicants. In employing insecticides, it is customary to prepare formulations containing inert diluents, dispersants, stickers, and other components, the exact ingredients being dependent on the intended use. Probably, the most predominant type of formulation encompasses the incorporation of the insect toxicant onto an inert, solid material known as a carrier. Numerous materials are used as carriers including various clays, diatomaceous earths, silica, wood flours and the like. Likewise, these formulations can contain various other substituents such as stickers, dispersants, wetting agents, etc.

While these formulations are quite acceptable and useful in the low concentration toxicant impregnates, there is a marked tendency for the higher concentration formulations to form large conglomerates of the insect toxicant-carrier combination. Upon this occurrence there is formed not the necessary free-flowing insect toxicant-carrier combination, but sizable masses thereof not suitable for use. This phenomena of caking is apparently promoted by increased temperature and pressure. For example, in high concentration solid insecticide dust or granular formulations stored in bags, it will often be found that a portion will be converted from a free-flowing material to a single cake or series of relatively large aggregates. The applications of these normally solid insect toxicants necessitate free-flowing material unimpeded by caked material.

Unexpectedly it has been found that the incorporation of a member of the mineralogical class of montmorillonoids, such as bentonite, into known carrier systems, alleviates the caking problem. This is particularly unusual since montmorillonites have low adsorption properties in comparison with other solid carrier materials, and as a result are generally unacceptable carrier materials for the aforesaid insecticides since they produce readily caked formulations. Despite this it has now been found that their incorporation as a part of particular carrier blends results in a highly adsorptive carrier which maintains its desired particle size and flowability after being impregnated with said normally solid insecticides.

The percentage of each component in the final carrier blend in accordance with the present invention will vary with factors such as the identity of the insect toxicant, the concentration of insect toxicant to be impregnated onto the carrier, the type of ultimate application, etc. In general, the carrier material is composed of from about 25 to about 98 parts by weight attapulgite clay, from about 1 to about 20 parts by weight diatomaceous earth, and from 1 to about 75 parts by weight montmorillonite. A preferred composition contains from about 60 to about 95 parts by weight attapulgite clay, from about 2 to about 10 parts by weight diatomaceous earth, and from about 3 to 30 parts by weight montmorillonite. Of particular value are compositions containing from about 75 to about 85 parts by weight attapulgite clay, from about 3 to about 7 parts by weight diatomaceous earth, and from about 10 to about 20 parts by weight montmorillonite clay.

Attapulgite clays in general can be characterized as being predominantly magnesium silicate in the form of fibrous particles which make them highly sorptive materials. An attapulgite clay of particular value in the present invention is Florex AA–LVM, a product of the Floridin Co., Tallahassee, Florida. Other attapulgite clays can be used. It is preferred to use clays wherein the particles have mesh sizes between about 15/30 and 30/60.

It is also possible although not preferred to substitute for the attapulgite clay other carrier materials having oil sorptive properties and particle sizes comparable to the attapulgites. This component (attapulgite clay or its equivalent) should have a pKa greater than 3. This surface acidity can be obtained from the untreated attapulgite clay or by treating the clay with a deactivator, as high surface acidity materials are well known to be harmful to formulations.

The diatomaceous earth preferably utilized herein should have a relatively high oil adsorption and a maximum mesh size of 325. Typical diatomaceous earths quite suitable for the present application are Celite 209 and Celite 400, products of the Johns-Manville Corp., New York City. Chemically they are essentially silica, 91% thereof having a particle size less than 10 microns. Other diatomaceous earths having comparable adsorptions, acidity and particle size are operable. The term "diatomaceous earth," like the term "attapulgite clay," contemplates the commercially available products which contain minor amounts of other materials.

The third and key component, a montmorillonite clay, is chemically composed of a preponderance of silica and alumina. Its oil adsorptivity is normally lower than attapulgite clays and it is of less value by itself as a carrier material for insect toxicants. In order to be of utility in the present invention, the particle size of the montmorillonite clay should be relatively small, i.e., a maximum size of about 20–40 mesh. Because of its low cost, it is desirable to use a maximum proportion of bentonite. Further, the surface acidity of the montmorillonite for the same reason as earlier explained for the attapulgite clay must be controlled. Volclay 2040, produced by the American Colloid Co., Chicago, Illinois, is a bentonite particularly suitable to the present invention.

The actual blending of the components of the insecticide formulation is preferably performed by blending the attapulgite clay and montmorillonite clay, incorporating the insect toxicant therein, and after this mixture has an appearance of having dried, adding the diatomaceous earth. When preparing the higher concentration formulations, i.e., between about 15 and 30 weight percent insect toxicant, in order to obtain the desired non-caking properties this method of preparation is critical. However, in the preparation of the lower concentration formulations other methods of preparation are useful. Thus, for example, the three inert carrier materials can be blended together followed by impregnation of the insect toxicant. When the three carrier substituents are blended together prior to an impregnation onto the insect toxicant they may be commingled in a blender such as a ribbon blender, using standard blending procedures. If desired, additives such as stickers, dispersants, wetting agents, etc., can be incorporated at various time intervals.

Likewise, when using the preferred procedure, the required amounts of attapulgite clay and montmorillonite clay are commingled in a blender such as a ribbon blender. This operation is followed by impregnation of the insect toxicant onto the blend. The impregnation can be performed by the means commonly used for the impregnation of insecticide. One such method is the spraying of the insecticide in a liquefied condition (obtained by means such as the use of solvent and/or heat) onto a moving body of the carrier in a closed tumbler, tank or blender. Upon the completion of the impregnation, the diatomaceous earth is then blended into the insecticide-carrier combination and the desired non-caking insecticide product recovered therefrom. Various additives can be added as liquids or solids during the preparation, either before or after the incorporation of the insect toxicant. It should be noted that the caking problem is more pronounced when preparing the relatively high concentration normally solid insect toxicants and more pronounced with the lower melting normally solid insects toxicants such as heptachlor. Correspondingly, the method of preparation becomes more critical with the higher concentration formulations and lower melting insecticides.

The following example illustrates the preferred technique.

*Example I*

AA–LVM Florex (49.1 pounds) and Volclay bentonite (13.1 pounds) were placed in a ribbon blender and thoroughly mixed for about 10 minutes. Technical heptachlor (28.1 pounds) and a heavy aromatic naphtha solvent (2 pounds) were heated to about 160° F. with stirring. The resultant solution was impregnated upon the carrier blend in the ribbon blender. Then the impregnated material was mixed several minutes until the granules appeared to be dry and Celite 209 (3.3 pounds) was blended therein.

A fifty-pound bag of the product of Example I was stored at a temperature of 120° F. under 30 similar 50-pound bags and found to be an uncaked, free-flowing material. Comparable tests performed on heptachlor carrier combinations using the present single carrier systems, or even two materials, demonstrated considerable caking of the formulations. While this occurs with many normally solid insecticides, it is particularly noticeable with the lower melting solids, possibly due to their enlarged tendency to crystallize on the carrier. At the higher concentrations of insecticide, i.e., 20 to 30% by weight, caking is quite prevalent and thus at these levels the use of the present tri-component carrier is of optimum value. However, it is useful in formulations containing from about 0.5 to about 30% by weight insect toxicant.

*Example II*

AARVM Floridin (66 pounds), Celite 209 (10 pounds) and Volclay bentonite (24 pounds) are placed in a ribbon blender with continuous agitation. Ethylene glycol (6 pounds) is sprayed thereon to reduce the surface acidity of the carrier. A solution of heptachlor (15 pounds) and xylene solvent (2 pounds) is sprayed upon the agitated carrier blend and agitation of the blend is continued for about 10 minutes after completion of the heptachlor impregnation.

AARVM Floridin is an attapulgite clay produced by the Floridin Co., Tallahassee, Florida. The product of Example II, like the product of Example I, is ready for use and is presently used for insecticide formulations such as by dusting, spreading, slurrying, etc. without the problems caused by caked formulations, such as clogged equipment, uneven distributions of insect toxicant, impossibility of ultimate application, necessity of reworking material, etc.

While the foregoing examples show the use of heptachlor, other insect toxicants are equally operable. Since the caking problem essentially occurs with the use of the normally solid insect toxicants, such insecticides as aldrin, dieldrin, lindane, etc., can be advantageously employed in accordance with the present invention. The impregnation of all of the normally solid insecticides is accomplished by means as used in general for impregnations, such as by dissolving the insecticide in a suitable solvent or otherwise liquefying it, followed by spraying it onto the carrier material. Likewise, commercially available montmorillonite clay, diatomaceous earths and attapulgite clays other than those specified in the examples and having the necessary adsorption and particle size are equivalent to the materials of the examples and interchangeable therewith.

Other representative formulations are as follows, with the parts of each substituent indicated by weight:

*Example III*

| | |
|---|---|
| Heptachlor | 20 |
| AALVM attapulgite | 72 |
| Celite 400 | 5 |
| Panther Creek bentonite | 3 |

AALVM attapulgite is a commercial attapulgite clay produced by the Minerals and Chemicals Corp. of America. Panther Creek bentonite is a commercial bentonite produced by the American Colloid Co.

*Example IV*

| | |
|---|---|
| Aldrin | 25 |
| AARVM attapulgite | 20 |
| Dicalite 1G–5 | 2 |
| Black Hills bentonite | 53 |

Dicalite 1G–5 is a commercial diatomaceous earth produced by the Great Lakes Carbon Co. Black Hills bentonite is a commercial bentonite produced by the International Minerals and Chemicals Corporation.

*Example V*

| | |
|---|---|
| DDT | 30 |
| AALVM Florex | 20 |
| Dicalite 109–3 | 25 |
| Volclay bentonite | 25 |

*Example VI*

| | |
|---|---|
| Dieldrin | 20 |
| AARVM-Floridin | 64 |
| Celatom MP–61 | 4 |
| Panther Creek bentonite | 12 |

*Example VII*

| | |
|---|---|
| Lindane | 30 |
| AALVM Attapulgite | 68 |
| Celite 209 | 1 |
| Black Hills bentonite | 11 |

*Example VIII*

| | |
|---|---|
| Heptachlor | 10 |
| AARVM attapulgite | 54 |
| Celite 400 | 6 |
| Volclay bentonite | 30 |

*Example IX*

| | |
|---|---|
| Heptachlor | 15 |
| AARVM Florex | 76 |
| Celite 400 | 8 |
| Panther Creek bentonite | 1 |

*Example X*

| | |
|---|---|
| Heptachlor | 30 |
| AALVM Floridin | 61 |
| Celite 209 | 2 |
| Volclay bentonite | 7 |

*Example XI*

| | |
|---|---|
| Heptachlor | 25 |
| AARVM Attapulgite | 45 |
| Dicalite 109–3 | 4 |
| Black Hills bentonite | 26 |

Example XII

| | |
|---|---|
| Dieldrin | 30 |
| AALVM Florex | 35 |
| Celite 209 | 3 |
| Volclay bentonite | 32 |

Example XIII

| | |
|---|---|
| Aldrin | 10 |
| AARVM Floridin | 72 |
| Celite 400 | 2 |
| Black Hills bentonite | 16 |

Example XIV

| | |
|---|---|
| Heptachlor | 20 |
| AARVM Florex | 13 |
| Celite 209 | 5 |
| Volclay | 62 |

Example XV

| | |
|---|---|
| Heptachlor | 10 |
| AALVM Floridin | 54 |
| Celite 400 | 4 |
| Black Hills bentonite | 32 |

Example XVI

| | |
|---|---|
| Heptachlor | 5 |
| AARVM Florex | 45 |
| Celite 209 | 5 |
| Volclay bentonite | 45 |

Example XVII

| | |
|---|---|
| Aldrin | 15 |
| AARVM attapulgite | 57 |
| Celite 209 | 3 |
| Black Hills bentonite | 25 |

Example XVIII

| | |
|---|---|
| Heptachlor | 25 |
| AARVM attapulgite | 60 |
| Celite 209 | 5 |
| Pikes' Peak clay | 10 |

Pikes' Peak clay is a commercial montmorillonite clay produced by the Several Reduction Corp.

We claim:

1. A method for the production of a non-caking, free-flowing granular insecticidal composition of matter which comprises blending from about 60 to about 95 parts by weight attapulgite clay having a particle size substantially of from about 15 to about 60 mesh with from about 3 to about 30 parts by weight montmorillonite clay having a maximum particle size substantially of from about 20 to about 40 mesh, uniformly impregnating said blend with heptachlor in liquefied condition, and thereafter further blending therewith from about 2 to about 10 parts by weight diatomaceous earth having a maximum mesh size of 325.

2. A method for the production of a non-caking, free-flowing granular insecticidal composition of matter which comprises blending from about 75 to about 85 parts by weight attapulgite clay having a particle size substantially of from about 15 to about 60 mesh with from about 10 to about 20 parts by weight montmorillonite clay having a maximum particle size substantially of from about 20 to about 40 mesh, uniformly impregnating said blend with heptachlor, and from about 3 to about 7 parts by weight of diatomaceous earth having a maximum mesh size of 325 blended therewith when the liquefied impregnated insect toxicant solidifies.

3. A non-caking, free-flowing granular insecticidal composition of matter composed essentially of heptachlor and a free-flowing, inert carrier system consisting of from about 60 to about 95 parts by weight attapulgite clay having a particle size substantially of from about 15 to about 60 mesh from about 2 to about 20 parts by weight diatomaceous earth having a maximum mesh size of 325 and from about 3 to about 30 parts by weight montmorillonite clay having a maximum particle size substantially of from about 20 to about 40 mesh.

4. The composition of claim 3 wherein the heptachlor content is from about 15 to about 30 percent by weight of the product.

References Cited in the file of this patent

UNITED STATES PATENTS

| 2,296,689 | Soderberg | Sept. 22, 1942 |
| 2,529,681 | Flenner | Nov. 14, 1950 |
| 2,529,682 | Flenner | Nov. 14, 1950 |

OTHER REFERENCES

Miller: Agr. Chem. J. Nov. 1950, pages 42–43.

Handbook of Insecticide Dust Diluents and Carriers, 2nd ed. 1955, Dorland Books.